June 23, 1970     M. L. LOCKARD     3,516,284
LEAK DETECTOR
Filed June 19, 1968
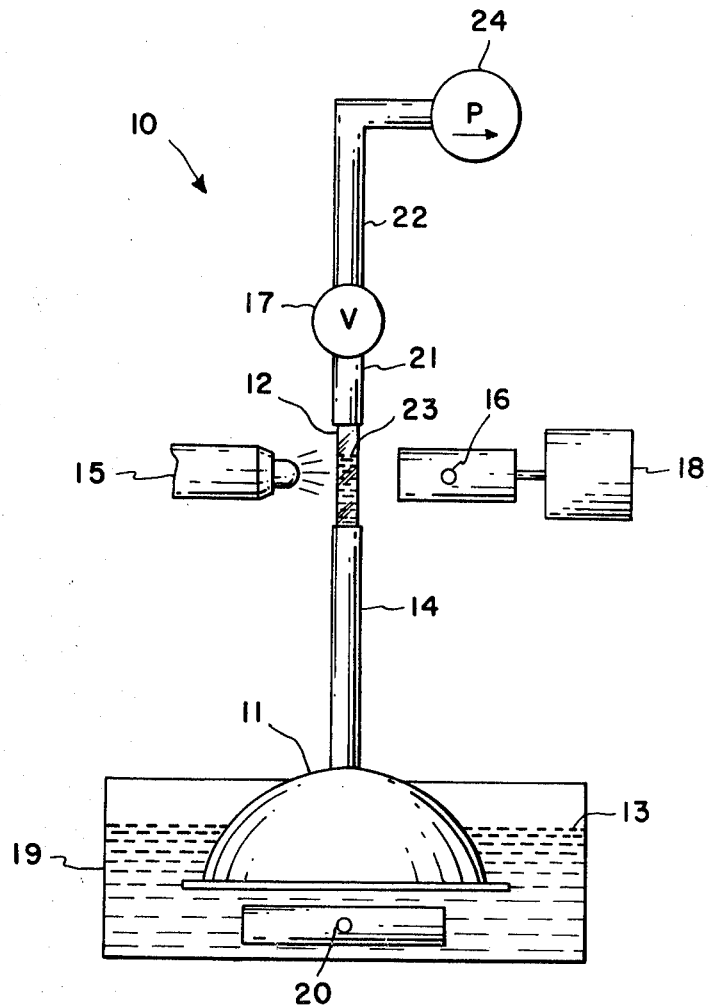
INVENTOR.
MILES L. LOCKARD
BY
ATTORNEYS

United States Patent Office 3,516,284
Patented June 23, 1970

3,516,284
LEAK DETECTOR
Miles L. Lockard, Newport News, Va., assignor to the United States of America as represented by the Administrator of the National Aeronautics and Space Administration
Filed June 19, 1968, Ser. No. 738,314
Int. Cl. G01m 3/06
U.S. Cl. 73—45.5        7 Claims

ABSTRACT OF THE DISCLOSURE

Apparatus for detecting fluid leaks in a sealed fluid receptacle comprising a container of liquid with a hood partly submerged in the liquid, having a tube extending up from the hood, formed with a transparent section therein, and supplied with a vacuum source to draw the liquid up into the hood and tube. By placing the specimen fluid receptacle into the liquid and under the hood, bubbles from leaks are collected in the hood, pass into the tube and through the transparent section which is monitored by a light source and photocell arrangement to automatically detect the bubble and thus ascertain the existence of the leak.

---

The invention described herein was made by an employee of the United States Government and may be manufactured and used by or for the Government for governmental purposes without the payment of any royalties thereon or therefor.

This invention relates to leak detection apparatus, and more particularly to leak detection apparatus which provides detection of fluid leaks in a sealed receptacle without the need for human monitoring of the equipment.

Prior art leak detection apparatus has usually suffered from the substantial drawback that human monitoring of the equipment is required in order to determine when a leak has occurred. While such disadvantage is not severe when leaks appear rather promptly, in the context of leaks which appear from fatigue failure of welds, joints, etc., of a fluid receptacle experiencing many hours or days of pulsing pressures, such a requirement does become an extreme handicap.

Other prior art attempts to overcome this disadvantage have resulted in complex electronic devices which are both expensive and unreliable.

Therefore, it is an object of the present invention to provide a leak detection apparatus which does not require a human monitor in order to detect a leak in a fluid container yet provides a simple and reliable operating mechanism.

Referring to the drawing, the figure is a schematic view of the apparatus according to the present invention.

In the drawing, 10 indicates the general apparatus in which a dome-shaped hood 11 is partially submerged below the fluid level of a fluid 13 disposed in a container 19. This fluid may be water, with an additive to break down the surface tension so that bubbles do not cling to the dome and tubing and pass quickly through the system.

A tube 14, in communication with the volume enclosed by the hood 11, leads upwardly and has connected thereto a transparent tube length 12 which is connected to an upper tube section 21, valve 17, and tube 22 which in turn is connected to a vacuum source, such as an evacuated tank or the low pressure side of a pump. This source produces a pressure sufficiently low so that when the valve 17 is open atmospheric pressure will force the fluid 13 up into the hood and the tubing and into the transparent section 12 to the level indicated at 23.

Disposed with the transparent section 12 therebetween are a conventional light source 15 and photocell 16 with an electrically connected control device which may be a buzzer, light, pen recorder, etc., indicated at 18.

In order to operate this system, specimen sealed receptacle 20 containing a fluid is placed in the container 19 beneath the hood 11.

The pump 24 is started, valve 17 is opened so that fluid is drawn up through the hood 11, tube 14 and transparent section 12 and then closed to maintain this level and the pump 24 stopped. The fluid is thus held in the tubes 12 and 14, at a level such that bubbles formed in the liquid will appear at the photocell.

When a leak occurs, bubbles rise due to buoyant forces and are collected into the hood 11 where they are channeled into the tube 14 and pass through the transparent section 12. Their passage interrupts the light passing to the photocell 16 from the light source 15 due to reflectance therefrom and refractory bending and produces an electrical signal in a well-known manner which is in turn utilized to operate the control device 18.

From this description can be seen that a leak detection system has been provided which requires no human monitor and indeed may be left unattended for hours, days, or as long as need be, and in addition, will function with a high degree of certainty as the components involved are simple and reliable and the entire arrangement is of such simplicity that malfunctioning and unreliability are almost eliminated.

It should also be noted at this point that while a specific embodiment has been described for the sake of clarity, the invention is not to be so limited, as for example, numerous fluids may be utilized in the system as long as its density is such that the bubble of fluid escaping from the specimen will rise therein to pass upwardly into the tubing. Also, the electrical signal may be used to operate any number of control devices, such as automated machinery, to shut down test equipment, etc.

I claim:

1. A leak detection system for detecting leakage in a sealed fluid receptacle comprising:
    (a) a container of fluid;
    (b) a light source;
    (c) photocell means spaced from said light source and adapted to produce an electrical signal when varying light intensities impinge thereon;
    (d) conduit means containing a portion of the fluid intermediate said photocell means and light source at a level above said container;
    (e) means directing light from said source to pass through said portion of the fluid and impinge on said photocell;
    (f) evacuation means for drawing fluid into said conduit means;
    (g) means holding evacuation such that the level of the liquid remains above the photocell means enabling rising bubbles to pass said photocell means; and
    (h) means directing bubbles formed in said fluid to pass into said conduit means and to the fluid portion between said photocell means and light source, whereby leakage from a sealed fluid receptacle immersed in said fluid produces an electrical signal due to bubbles of such leakage fluid in said portion varying the light transmitted to said photocell means.

2. The system of claim 1 wherein said conduit means is a transparent tube in fluid communication with said fluid.

3. The system of claim 1 wherein said evacuation means includes means producing a pressure lower than that exerted on said contained fluid upstream of said tube, whereby fluid is drawn into said tube.

4. The system of claim 1 further including means producing a recording of said electrical signal whereby leakage detection may be accomplished without human supervision.

5. The system of claim 1 wherein said evacuation means is pressure reducing means; said evacuation holding means is valve means associated with said conduit means; and bubble directing means including means collecting said bubbles and directing them into said conduit means.

6. The system of claim 5 wherein said collecting means includes a member having converging walls and arranged with its wide end extending downwardly into said fluid and means connecting its upper end to said conduit means.

7. The system of claim 6 wherein said fluid contains an additive to break down the surface tension.

References Cited
UNITED STATES PATENTS

| | | | |
|---|---|---|---|
| 2,333,791 | 11/1943 | Hutchison | 73—194 |
| 2,567,215 | 9/1951 | Lacks | 73—45.5 |
| 3,003,023 | 5/1962 | Hooper et al. | 73—45.5 |

S. CLEMENT SWISHER, Primary Examiner

W. A. HENRY II, Assistant Examiner